US008815434B2

(12) United States Patent  (10) Patent No.: US 8,815,434 B2
Ahn et al.  (45) Date of Patent: Aug. 26, 2014

(54) ELECTRODE ASSEMBLY FOR SECONDARY BATTERY WITH WOUND AND FOLDED SEPARATOR PORTIONS AND SECONDARY BATTERY HAVING THE SAME

(75) Inventors: Changbum Ahn, Yongin-si (KR);
Jeongsoon Shin, Yongin-si (KR);
Youngbae Sohn, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 548 days.

(21) Appl. No.: 12/913,711

(22) Filed: Oct. 27, 2010

(65) Prior Publication Data

US 2011/0104550 A1    May 5, 2011

(30) Foreign Application Priority Data

Nov. 2, 2009  (KR) .................. 10-2009-0104814

(51) Int. Cl.
*H01M 2/14*  (2006.01)
*H01M 2/18*  (2006.01)
*H01M 10/04*  (2006.01)
*H01M 10/0583*  (2010.01)

(52) U.S. Cl.
CPC ............ *H01M 2/18* (2013.01); *H01M 10/0431* (2013.01); *H01M 10/0583* (2013.01)
USPC ............................ 429/131; 429/129; 429/149

(58) Field of Classification Search
CPC  H01M 2/18; H01M 10/0431; H01M 10/0583
USPC .......................................... 429/129, 131, 149
See application file for complete search history.

(56) References Cited

U.S. PATENT DOCUMENTS

| 6,423,449 | B1 * | 7/2002 | Hong ....................... 429/231.95 |
| 2007/0184350 | A1 | 8/2007 | Kim et al. |
| 2008/0280208 | A1 | 11/2008 | Naoi et al. |
| 2009/0159347 | A1 * | 6/2009 | Zhou et al. ................... 180/65.1 |
| 2009/0305121 | A1 | 12/2009 | Yoon et al. |
| 2010/0015511 | A1 * | 1/2010 | Yoo et al. ......................... 429/94 |
| 2011/0217586 | A1 | 9/2011 | Kim et al. |

FOREIGN PATENT DOCUMENTS

| KR | 10-2007-0020597 A | 2/2007 |
| KR | 10-2007-0116295 A | 12/2007 |
| KR | 10-2008-0005629 A | 1/2008 |
| KR | 10-2008-0005631 A | 1/2008 |
| KR | 10-0859996 B1 | 9/2008 |
| KR | 10-2009-0008075 A | 1/2009 |
| WO | WO 2007142428 A1 * | 12/2007 |

OTHER PUBLICATIONS

Korean Notice of Allowance dated Mar. 23, 2012 for Korean Patent Application No. KR 10-2009-0104814 which corresponds to captioned U.S. Appl. No. 12/913,711.
Korean Office Action dated Oct. 19, 2011 for Korean Patent Application KR No. 10-2009-0104814 which corresponds to U.S. Appl. No. 12/913,711.

* cited by examiner

*Primary Examiner* — Zachary Best
(74) *Attorney, Agent, or Firm* — Knobbe, Martens, Olson & Bear, LLP

(57) ABSTRACT

An electrode assembly for a secondary battery and a secondary battery having the same, the electrode assembly including electrode members disposed in a stack and divided into groups; and a first separator having folded portions disposed between the electrode members, and wound portions extending from the folded portions and wrapped around the groups.

20 Claims, 5 Drawing Sheets

ELECTRODE ASSEMBLY FOR SECONDARY BATTERY WITH WOUND AND FOLDED SEPARATOR PORTIONS AND SECONDARY BATTERY HAVING THE SAME

CROSS-REFERENCE TO RELATED APPLICATION

This application claims the benefit of Korean Patent Application No. 10-2009-0104814, filed Nov. 2, 2009, in the Korean Intellectual Property Office, the disclosure of which is incorporated herein, by reference.

BACKGROUND

1. Field

Aspects of the present disclosure relate to an electrode assembly for a secondary battery and a secondary battery including the same.

2. Description of the Related Technology

In general, a secondary battery is manufactured by accommodating an electrode assembly in an outer case. The electrode assembly includes a positive electrode plate, a negative electrode plate, and a separator interposed therebetween.

In a high-capacity secondary battery, an electrode assembly may be used that includes a stack of electrode members and separators sandwiched between the electrode members. The electrode assembly may be a jellyroll-type or a zigzag folded-type. In the jellyroll type electrode assembly, however, it is not easy to achieve accurate alignment of electrode members. Further, the zigzag-type electrode assembly may be structurally weak.

SUMMARY

Aspects of the present disclosure provide an electrode assembly for a secondary battery, in which electrode members can be easily aligned with one another and which is structurally reinforced, and a secondary battery having the same.

In accordance with one aspect of the present disclosure, there is provided an electrode assembly for a secondary battery including electrode members stacked along a reference line extending in one direction, and a first separator separating adjacent electrode members. The first separator includes folded portions folded in a zigzag shape, and wound portions connecting each of the folded portions.

According to aspects of the present disclosure, the folded portions may include a first folded portion and a second folded portion, arranged along the reference line. The wound portions may include a first wound portion and a second wound portion. The first wound portion may be wrapped around the first folded portion and may be connected to the second wound portion. The second wound portion may be wrapped around the second folded portion and the first wound portion.

According to aspects of the present disclosure, the wound portions may be wound in the same direction.

According to aspects of the present disclosure, winding directions of the wound portions may be alternated.

According to aspects of the present disclosure, the center of the electrode members may be positioned on the reference line.

According to aspects of the present disclosure, the electrode members may include a positive electrode member and a negative electrode member. The electrode plates may be alternately stacked on one another. The positive electrode member may be formed of a positive electrode plate, and the negative electrode member may be formed of a negative electrode plate.

According to aspects of the present disclosure, the electrode members may be configured such that positive and negative electrode plates are alternately stacked, with a third separator disposed therebetween. The electrode plates positioned on both surfaces of each of the electrode members may be of the same polarity.

According to aspects of the present disclosure, each of the electrode members may include a positive electrode plate, a negative electrode plate, and a third separator disposed therebetween.

In accordance with still another aspect of the present disclosure, there is provided a secondary battery including the electrode assembly and an external case to house the electrode assembly.

According to the present disclosure, since the electrode assembly including a zigzag folded portion and a wound portion wound thereon, the folded portion is structurally reinforced and the electrode members can be precisely aligned.

Additional aspects and/or advantages of the present disclosure will be set forth in part in the description which follows and, in part, will be obvious from the description, or may be learned by practice of the present disclosure.

BRIEF DESCRIPTION OF THE DRAWINGS

These and/or other aspects and advantages of the present disclosure will become apparent and more readily appreciated from the following description of the exemplary embodiments, taken in conjunction with the accompanying drawings, of which.

DETAILED DESCRIPTION

Figure 1:
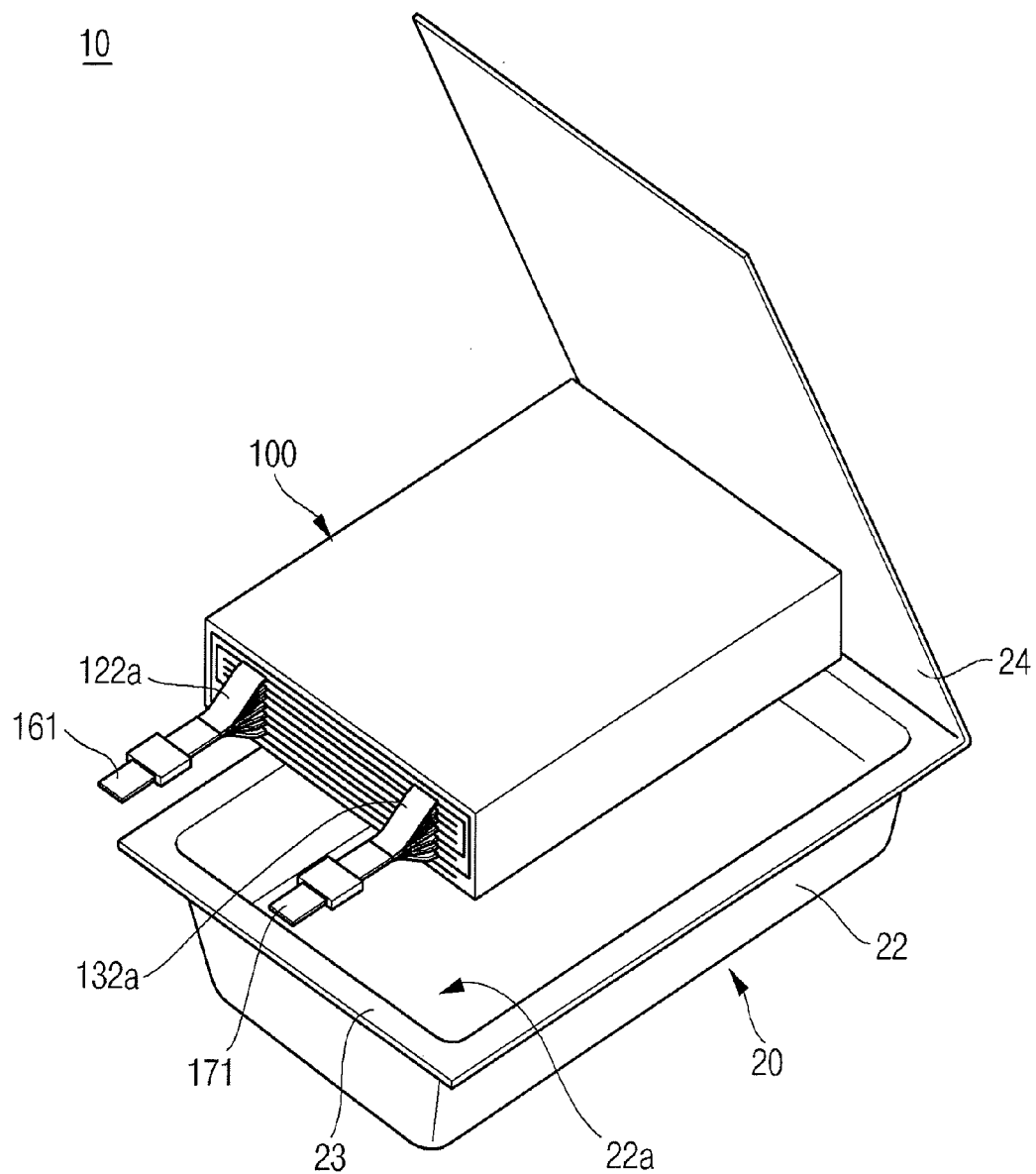
FIG. 1 is a perspective view of a secondary battery including an electrode assembly, according to an exemplary embodiment of the present disclosure.

Reference will now be made in detail to the exemplary embodiments of the present disclosure, examples of which are illustrated in the accompanying drawings, wherein like reference numerals refer to the like elements throughout. The exemplary embodiments are described below, in order to explain the aspects of the present disclosure, by referring to the figures.

FIG. 1 is a perspective view of a secondary battery 10 including an electrode assembly 100, according to an exemplary embodiment of the present disclosure. Referring to FIG. 1, the secondary battery 10 is a pouch-type secondary battery, and includes an external case 20 to house the electrode assembly 100.

The external case 20 includes a case body 22 and a cover 24. The case body 22 is provided with a receiving part 22a that is a space for receiving the electrode assembly 100, and a sealing part 23 that extends outwardly from an entrance of the receiving part 22a. The cover 24 is attached to one side of the sealing part 23. After the electrode assembly 100 is received in the receiving part 22a, the case body 22 and the cover 24 are hermetically sealed together. In such a state, the sealing part 23 is thermally welded to the cover 24.

Figure 2:
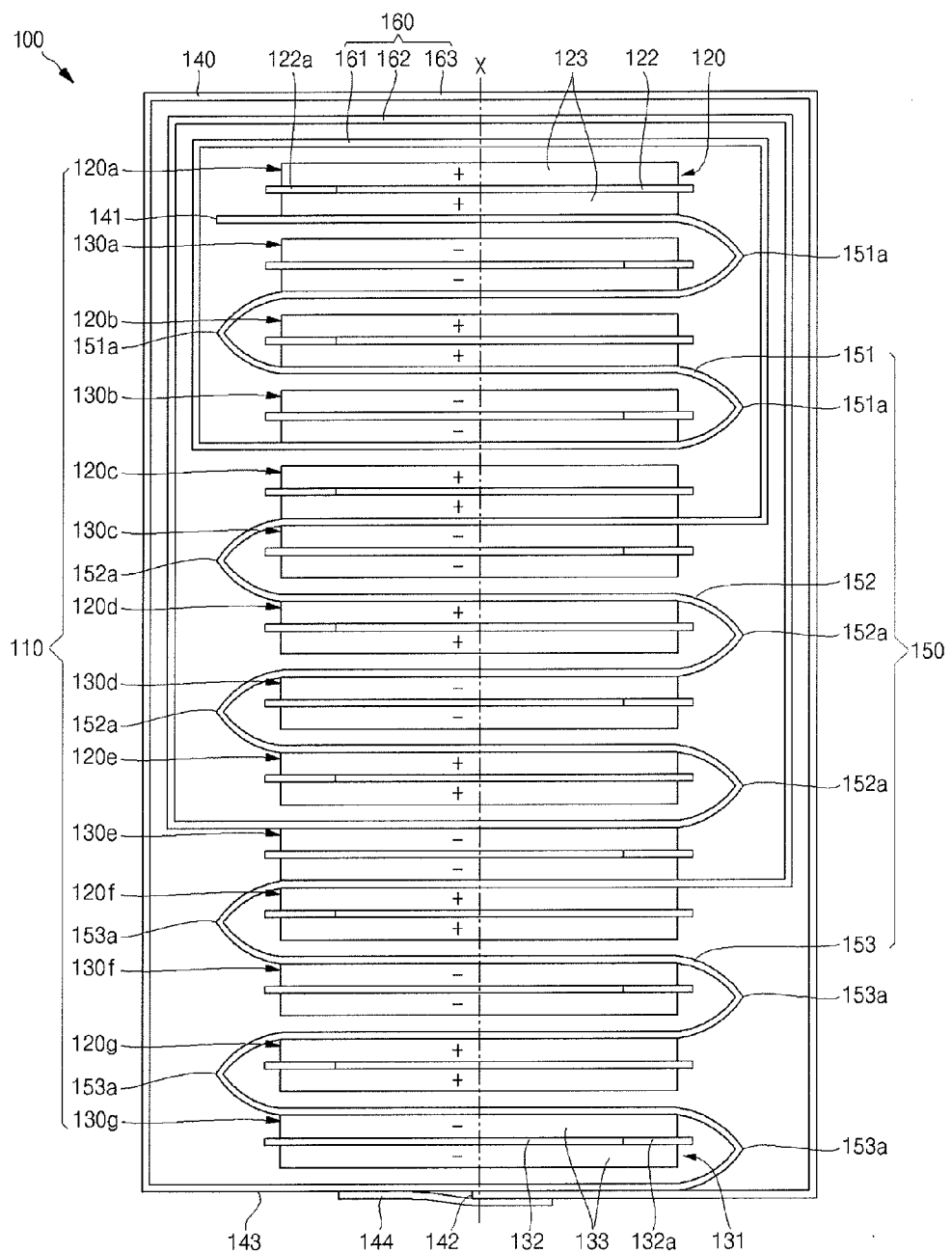
FIG. 2 is a schematic diagram illustrating a first exemplary embodiment of the electrode assembly illustrated in FIG. 1.

FIG. 2 is a schematic diagram of the electrode assembly 100 illustrated in FIG. 1. Referring to FIG. 2, the electrode assembly 100 includes stacked electrode members 110 and a first separator 140.

The stacked electrode members 110 are arranged (centered) along a reference line X, and the first separator 140 separates adjacent ones of the electrode members 110. The electrode members 110 are arranged such that positive electrode members 120a, 120b, 120c, 120d, 120e, 120f, and 120g and negative electrode members 130a, 130b, 130c, 130d, 130e, 130f, and 130g are alternately stacked, along the reference line X.

Each of the positive electrode members 120a, 120b, 120c, 120d, 120e, 120f, and 120g is formed of a single positive electrode plate 121. The positive electrode plate 121 includes a positive electrode collector 122 and a positive active material 123 coated on opposing surfaces of the positive electrode collector 122. In general, the positive electrode collector 122 is formed of a conductive metal plate made of, for example, aluminum (Al). An uncoated portion of the positive electrode collector 122 forms a positive electrode tab 122a that protrudes outwardly. The positive electrode tab 122a is welded to a positive electrode terminal 161 that is drawn to the exterior of the case 20, by a general welding method such as spot welding, ultrasonic welding or resistance welding. The positive active material 123 includes a composite compound containing lithium, a conductive member to enhance conductivity, and a binder to enhance the cohesion therebetween, for example.

Each of the negative electrode members 130a, 130b, 130c, 130d, 130e, 130g, 130f, and 130g is formed of a single negative electrode plate 131. The negative electrode plate 131 includes a negative electrode collector 132 and a negative active material 133 coated on opposing surfaces of the negative electrode collector 132. In general, the negative electrode collector 132 is formed of a conductive metal plate made of, for example, copper (Cu). An uncoated portion of the negative electrode collector 132 forms a negative electrode tab 132a that protrudes outwardly. The negative electrode tab 132a is welded to a negative electrode terminal 171 that is drawn to the exterior of the case 20, by a general welding method such as spot welding, ultrasonic welding or resistance welding. The negative active material 133 includes a carbon material, such as graphite, and a binder, for example. In addition, the negative active material 133 may include tin oxide (SnO) or lithium titanium oxide (LTO). When graphite is used for the negative active material, an area of the corresponding positive electrode plate may be smaller than that of the negative electrode plate. In addition, when SnO or LTO is used as the negative active material, an area of the corresponding positive electrode plate may be greater than that of the negative electrode plate.

Referring to FIG. 2, the first separator 140 includes folded portions 150 and wound portions 160. The first separator 140 separates adjacent ones of the electrode members 110. The first separator 140 includes micropores, and lithium ions move between adjacent electrode members 110, through the micropores. The first separator 140 may be made of a polymer resin, such as polyethylene (PE) or polypropylene (PP).

The folded portions 150 include a first folded portion 151, a second folded portion 152, and a third folded portion 153, sequentially arranged (centered) along the reference line X. The first folded portion 151 is folded in a zigzag shape and extends from a first end 141 of the first separator 140. The first folded portion 151 separates the unit electrodes 120a, 130a, 120b, and 130b from one another and includes folds 151a. The first folded portion 151 includes creases 151a.

The second folded portion 152 is folded in a zigzag shape and extends from the wound portion 160. The second folded portion 152 separates the electrode members 120c, 130c, 120d, 130d, and 120e from one another. The second folded portion 152 includes creases 152a.

The third folded portion 153 is folded in a zigzag shape and extends from the wound portion 160. The third folded portion 153 separates the electrode members 130e, 120f, 130f, 120g, and 130f from one another. The third folded portion includes creases 153a. During folding, the folded portions 151, 152, and 153 are positioned such that the respective electrode members 110 are precisely aligned (centered) along the reference line X.

The wound portions 160 include a first wound portion 161, a second wound portion 162, and a third wound portion 163, which are wound in the same direction (clockwise in the drawing). The wound portions 160 wrap around the folded portions 150 and structurally reinforce the electrode assembly 100.

The first wound portion 161 extends from the first folded portion 151, around the first folded portion 151 and the corresponding electrode members 110, to the second folded portion 152. Since the first wound portion 161 is wrapped around the first folded portion 151, it thereby reinforces the structure of the first folded portion 151 and the corresponding electrode members 110.

The second wound portion 162 extends from the second folded portion 152, around the second folded portion 152 and the first wound portion 161, to the third folded portion 153. The second wound portion 162 is wrapped around the second folded portion 152, and the corresponding electrode members 110, thereby reinforcing the structure of the second folded portion 152. In addition, the second wound portion 162 is also wrapped around the first wound portion 161. Therefore, the first folded portion 151 is further structurally reinforced.

The third wound portion 163 extends from the third folded portion 153, around the third folded portion 153 and the second wound portion 162. The third wound portion 163, thereby reinforcing the structure of the third folded portion 153. In addition, since the third wound portion 163 wraps around the second wound portion 162, the first folded portion 151 and the second folded portion 152 are further structurally reinforced. A second end 142 of the first separator 140 is fixed to an outer surface 143 of the first separator 140, by an adhesive tape 144.

Since the wound portions 160 are wrapped around both the folded portions 150, the electrode assembly 100 is structurally reinforced. The electrode assembly 100 can be manufactured by repeatedly performing folding and wound processes for additional electrode members 110, as would be understood by one skilled in the art. The wound portions 160 are wound in the same direction, thereby increasing the manufacturing efficiency.

Figure 3:
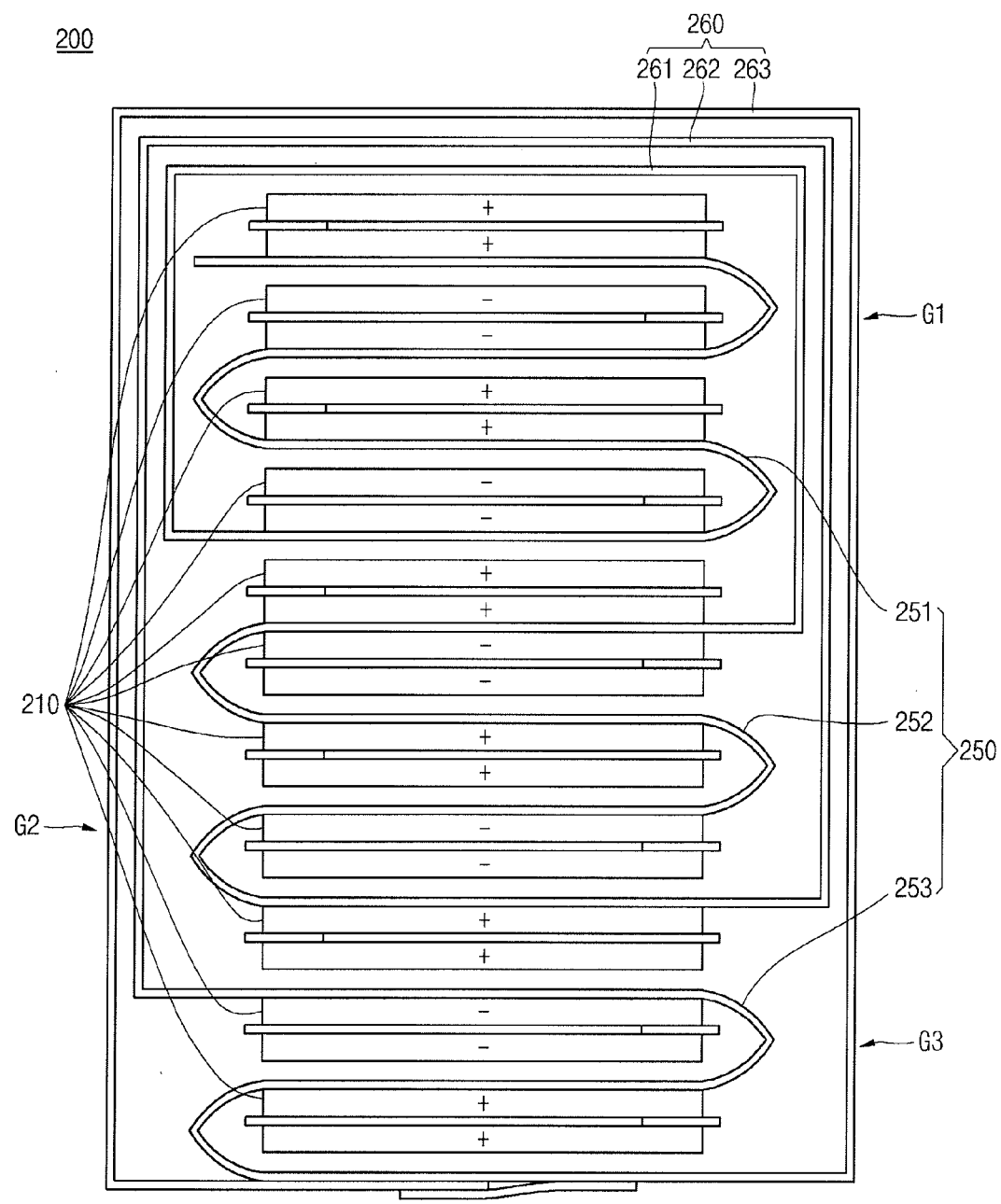
FIG. 3 is a schematic diagram illustrating a second exemplary embodiment of the electrode assembly illustrated in FIG. 1.

FIG. 3 is a schematic diagram illustrating another exemplary embodiment of an electrode assembly 200 that can be included in the battery 10 illustrated in FIG. 1. Referring to FIG. 3, the electrode assembly 200 includes multiple electrode members 210, and a separator 240. Since the electrode members 210 are configured in substantially the same manner with the electrode members 110 illustrated in FIG. 2, a detailed explanation thereof will not be given.

The separator 240 includes multiple folded portions 250, and multiple wound portions 260. Since the folded portions 250 are configured in substantially the same manner with the folded portions 150 illustrated in FIG. 2, a detailed explanation thereof will not be given.

The wound portions 260 include a first wound portion 261, a second wound portion 262, and a third wound portion 263. The wound portions 260 wrap around the folded portions 250 and structurally reinforce the electrode assembly 200.

Winding directions of the second wound portion 262, for example, a counterclockwise direction in the drawing, are opposite to those of the first wound portions 261, for example, a clockwise direction in the drawing. Winding directions of the third wound portions 263, for example, a counterclockwise direction in the drawing, are opposite to those of the first wound portions 261, for example, a clockwise direction in the drawing.

In other words, the electrode members 210 can be divided into groups, for example groups G1-G3. The first folded portion 251 is inserted between the electrode members 210 of the first group G1. The first would portion 261 extends from the first folded portion 251 and is wrapped clockwise around the first group G1. The second folded portion 252 extends from the first wound portion 261 and is inserted between the electrode members 210 of the second group G2. The second wound portion 262 extends from the second folded portion 252 and is wrapped counter clockwise around the first and second groups G1 and G2. The third folded portion 253 extends from the second wound portion 262 and is inserted between the electrode members 210 of the third group G3. The third wound portion 263 extends from the third folded portion 253 and is wrapped clockwise around the first-third groups G1-G3.

Figure 4A:
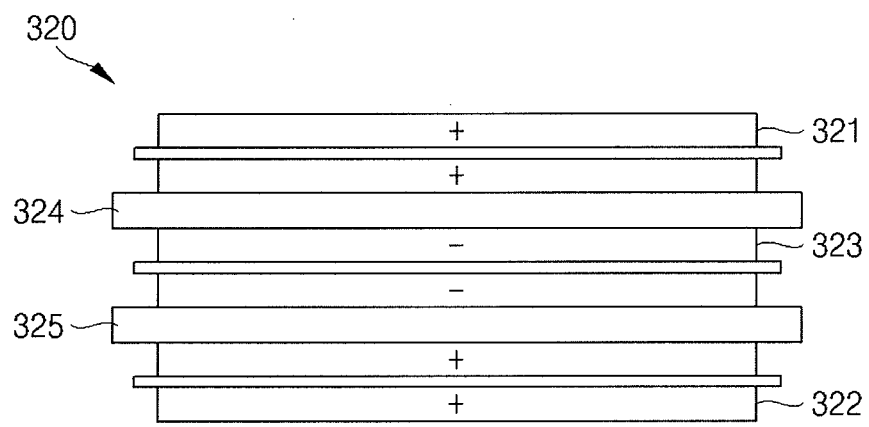
FIGS. 4A and 4B illustrate modifications of positive and negative electrode members illustrated in FIG. 2.
Figure 4B:
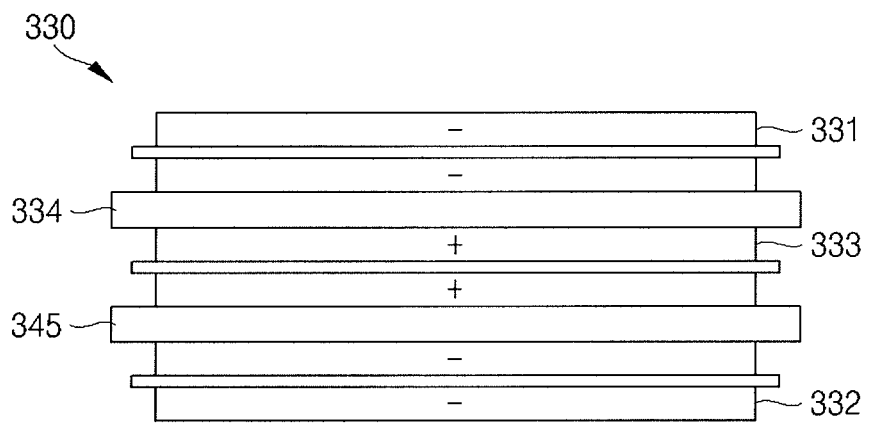
Figure 5:
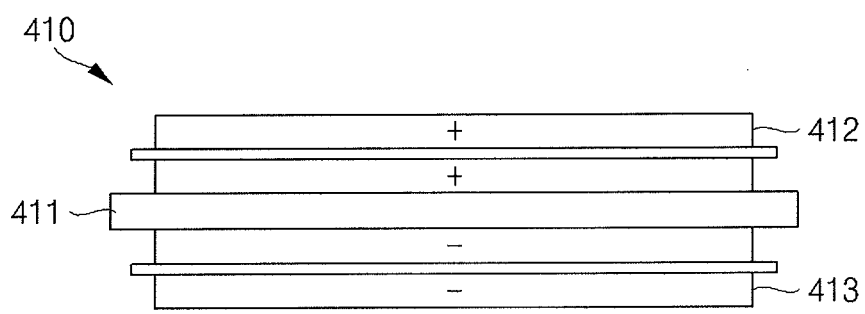
FIG. 5 is a schematic diagram illustrating another exemplary embodiment of the electrode members illustrated in FIG. 2.

FIGS. 4A, 4B, and 5 illustrate electrode members 320, 330, and 410 that can be substituted for the electrode members 110 illustrated in FIG. 2, according to aspects of the present disclosure. Referring to FIG. A, the electrode member 320 includes two positive electrode plates 321 and 322, a negative electrode plate 323 positioned between the positive electrode plates 321 and 322, and two second separators 324 and 325 inserted between the negative electrode plate 323 and the positive electrode plates 321 and 322. Accordingly, the electrode member 320 can be referred to as a positive electrode member. Since the electrode plates 321, 322, and 323 are similar to those illustrated in FIG. 2, a detailed explanation thereof will not be given.

Each of the second separators 324 and 325 includes micropores formed therein, and lithium ions move between the electrode plates 321, 322, and 323, through the micropores. The second separators 324 and 325 may be made of a polymer resin, such as polyethylene (PE) or polypropylene (PP).

Referring to FIG. B, the electrode member 330 includes two negative electrode plates 331 and 332, a positive electrode plate 333 positioned between the two negative electrode plates 331 and 332, and two second separators 334 and 335 inserted between the positive electrode plate 333 and the negative electrode plates 331 and 332. Accordingly, the electrode member 330 can be referred to as a negative electrode member. Since the electrode plates 331, 332, and 333 have the same configuration as illustrated in FIG. 2, a detailed explanation thereof will not be given.

Each of the second separators 334 and 335 includes micropores formed therein, and lithium ions move between the electrode plates 331, 332, and 333 through the micropores. The second separators 334 and 335 may be made of a polymer resin, such as polyethylene (PE) or polypropylene (PP).

Although the positive and negative electrode members 320 and 330 are formed of three electrode plates in the exemplary embodiments illustrated in FIGS. 4A and 4B, aspects of the present disclosure are not limited thereto, and the positive and negative electrode members 320 and 330 may be formed of more than three electrode plates. Each of the electrode members 320 and 330 may have any configuration, so long as electrode plates of different polarities are alternately stacked.

Referring to FIG. 5, the electrode member 410 includes, a positive electrode plate 412 a negative electrode plate 413, and a second separator 411 disposed therebetween. The second separator 411 includes micropores formed therein. Lithium ions move between the two electrode plates 412 and 413 through the micropores. The second separator 411 may be made of a polymer resin, such as polyethylene (PE) or polypropylene (PP). Since the electrode plates 412 and 413 are similar to those described with respect to FIG. 2, a detailed explanation thereof will not be given. According to the embodiment illustrated in FIG. 3C, an electrode assembly can be advantageously formed by stacking the electrode members 410.

Although a few exemplary embodiments of the present disclosure have been shown and described, it would be appreciated by those skilled in the art that changes may be made in these exemplary embodiments, without departing from the principles and spirit of the disclosure, the scope of which is defined in the claims and their equivalents.

What is claimed is:

1. An electrode assembly for a secondary battery, comprising:
    electrode members disposed in a stack and divided into groups; and
    a first separator including folded portions disposed between the electrode members of corresponding ones of the groups, and wound portions extending from the folded portions and wrapped around the groups,
    wherein the wound portions comprise first, second and third wound portions, wherein the first wound portion is surrounded by the second wound portion, wherein the second wound portion is enclosed by the third wound portion, and wherein the second wound portion comprises a surrounding portion that surrounds the first wound portion and a folded portion that does not surround the first wound portion, wherein the folded portion of the second wound portion extends from the first wound portion and is connected to the surrounding portion, and wherein the surrounding portion surrounds the first wound portion and the folded portion of the second wound portion.

2. The electrode assembly of claim 1, wherein:
    the folded portions comprise a first folded portion disposed between the electrode members of a first one of the groups, and a second folded portion disposed between the electrode members of a second one of the groups.

3. The electrode assembly of claim 1, wherein the wound portions are wound in the same direction.

4. The electrode assembly of claim 1, wherein the wound portions are wound in different directions.

5. The electrode assembly of claim 1, wherein the electrode members are centered on a reference line extending lengthwise, through the center of the stack.

6. The electrode assembly of claim 1, wherein the electrode members comprise:
    positive electrode members, each comprising a positive electrode plate comprising a positive current collector coated on opposing sides with a positive active material; and negative electrode members, each comprising a negative electrode plate comprising a negative current collector coated on opposing sides with a negative active material, wherein the positive and negative electrode members are alternately stacked on one another, in the stack.

7. The electrode assembly of claim 6, wherein the positive electrode members each comprise:

one of the negative electrode plates;

two of the positive electrode plates disposed on opposing sides of the negative electrode plate; and second separators disposed between the positive and negative electrode plates.

8. The electrode assembly of claim 6, wherein the negative electrode members each comprise:

one of the positive electrode plates;

two of the negative electrode plates disposed on opposing sides of the positive electrode plate; and second separators disposed between the positive and negative electrode plates.

9. The electrode assembly of claim 1, wherein the electrode members each comprise:

a positive electrode plate;

a negative electrode plate; and a second separator disposed between the positive and negative electrode plates, wherein the electrode members are disposed in the stack, such that the negative electrode plates of adjacent electrode members are not next to one another.

10. The electrode assembly of claim 9, wherein the folded portions are each folded in a zigzag shape, between the corresponding electrode members.

11. A secondary battery comprising:

an electrode assembly including electrode members disposed in a stack and divided into groups; and a first separator including folded portions disposed between the electrode members of corresponding ones of the groups, and wound portions extending from the folded portions and wrapped around the groups; and an external case housing the electrode assembly, wherein the wound portions comprise first, second and third wound portions, wherein the first wound portion is surrounded by the second wound portion, wherein the second wound portion is enclosed by the third wound portion, and wherein the second wound portion comprises a surrounding portion that surrounds the first wound portion and a folded portion that does not surround the first wound portion, wherein the folded portion of the second wound portion extends from the first wound portion and is connected to the surrounding portion, and wherein the surrounding portion surrounds the first wound portion and the folded portion of the second wound portion.

12. The secondary battery of claim 11, wherein:

the folded portions comprise a first folded portion disposed between the electrode members of a first one of the groups, and a second folded portion disposed between the electrode members of a second one of the groups.

13. The secondary battery of claim 11, wherein the wound portions are wound in the same direction.

14. The secondary battery of claim 11, wherein winding directions of the wound portions are alternately changed.

15. The secondary battery of claim 11, wherein the electrode members are centered on a reference line extending lengthwise, through the center of the stack.

16. The electrode assembly of claim 11, wherein the electrode members comprise:

positive electrode members, each comprising a positive electrode plate comprising a positive current collector coated on opposing sides with a positive active material; and negative electrode members, each comprising a negative electrode plate comprising a negative current collector coated on opposing sides with a negative active material, wherein the positive and negative electrode members are alternately stacked one on another, in the stack.

17. The secondary battery of claim 16, wherein the positive electrode members each comprise:

one of the negative electrode plates;

two of the positive electrode plates disposed on opposing sides of the negative electrode plate; and second separators disposed between the positive and negative electrode plates.

18. The secondary battery of claim 16, wherein the negative electrode members each comprise:

one of the positive electrode plates;

two of the negative electrode plates disposed on opposing sides of the positive electrode plate; and second separators disposed between the positive and negative electrode plates.

19. The secondary battery of claim 11, wherein the electrode members each comprise:

a positive electrode plate;

a negative electrode plate; and a second separator disposed between the positive and negative electrode plates, wherein the electrode members are disposed in the stack, such that the negative electrode plates of adjacent electrode members are not next to one another.

20. The secondary battery of claim 19, wherein the folded portions are each folded in a zigzag shape, between the corresponding electrode members.

* * * * *